US009612896B1

(12) United States Patent
Traylor et al.

(10) Patent No.: US 9,612,896 B1
(45) Date of Patent: Apr. 4, 2017

(54) PREDICTION OF DISK FAILURE

(71) Applicant: EMC Corporation, Hopkinton, MA (US)

(72) Inventors: Rachel L. Traylor, Arlington, TX (US); Mark A. Chamness, Menlo Park, CA (US); Richard M. Stern, Saratoga, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/834,261

(22) Filed: Aug. 24, 2015

(51) Int. Cl.
  *G06F 11/00* (2006.01)
  *G06F 11/07* (2006.01)
(52) U.S. Cl.
  CPC .......... *G06F 11/079* (2013.01); *G06F 11/076* (2013.01); *G06F 11/0727* (2013.01)
(58) Field of Classification Search
  CPC .... G06F 11/008; G06F 11/00; G06F 11/0754; G06F 11/076; G06F 2211/1073; G06F 2217/16; G06F 2212/032
  See application file for complete search history.

(56) References Cited

U.S. PATENT DOCUMENTS

| 6,192,484 B1 * | 2/2001 | Asano ................ G06F 11/1092 711/114 |
| 6,249,887 B1 * | 6/2001 | Gray ..................... G06F 11/008 714/44 |
| 7,890,791 B2 * | 2/2011 | Fukuyama ............ G06F 11/008 714/25 |
| 9,141,457 B1 * | 9/2015 | Ma ........................ G06F 11/008 |
| 2005/0091369 A1 * | 4/2005 | Jones ..................... H04L 41/06 709/224 |
| 2007/0079170 A1 * | 4/2007 | Zimmer ................ G06F 11/008 714/6.23 |
| 2008/0244309 A1 * | 10/2008 | Fukuyama ............ G06F 11/008 714/6.12 |

OTHER PUBLICATIONS

Strom, Brian D., et al., "Hard disk drive reliability modeling and failure prediction", IEEE Transactions on Magnetics, vol. 43, Issue 9, Sep. 2007, pp. 3676-3684.

(Continued)

*Primary Examiner* — Nadeem Iqbal
(74) *Attorney, Agent, or Firm* — Blakely, Sokoloff, Taylor & Zafman LLP

(57) ABSTRACT

Systems and methods are disclosed for predicting failure of a hard disk in a storage system. Embodiments are disclosed that predict failure of at least one hard disk in a storage system having a plurality hard disks. A data center reports to a data collection center than a hard disk has reported an initial non-zero medium error count (NMEC). The data collection center stores historic data of initial NMEC for many hard disks, and subsequent failure of those hard disks. From the historic data, the data collection center can report to the data center a prediction of when a hard disk reporting an initial NMEC may fail. Different models of hard disks fail at different times relative to a reported initial NMEC. The data collection center can track historic hard disk data by manufacturer, model of hard disk, and by model of storage system and thus can predict, by hard disk model, a probability of failure of a hard disk.

18 Claims, 12 Drawing Sheets

(56) References Cited

OTHER PUBLICATIONS

Chamness, Mark, "Capacity forecasting in a backup storage environment", LISA '11 Proceedings of the 25th international conference on Large Installation System Administration Conference, Boston, Massachusetts, Dec. 4-9, 2011, 9 pages.
Pinheiro, Eduardo, et al., "Failure trends in a large disk drive population", Proceedings of the 5th USENIX Conference on File and Storage Technologies (FAST '07), San Jose, California, Feb. 13-16, 2007, 13 pages.
Hamerly, Greg, et al., "Bayesian approaches to failure prediction for disk drives", Proceedings of the 18th International Conference on Machine Learning, Williamstown, Massachusetts, Jun. 28-Jul. 1, 2001, 8 pages.
Taylor, Paul, "Seagate Barracuda 7200.11 drives failing", accessed at: http://www.theinquirer.net/inquirer/news/1050374/seagate-barracude-7200-drives-failing on Aug. 25, 2015, page last updated Jan. 13, 2009, 2 pages.

* cited by examiner

| Historic Disk Data | | | | |
|---|---|---|---|---|
| Date-Time | Disk ID | NMEC | Initial NMEC | Status |
| 305→ 01-25-2015, 23:59 | FA5D-7823-CB23-5AEF | 5 | TRUE | ALIVE |
| 310→ 01-30-2015, 07:23 | 1245-DE82-AF45-B467 | 1 | TRUE | ALIVE |
| 315→ 01-31-2015, 12:00 | 789A-63BA-1245-FFB4 | 1 | TRUE | ALIVE |
| 320→ 02-01-2015, 21:56 | FA5D-7823-CB23-5AEF | 6 | FALSE | ALIVE |
| 325→ 02-14-2015, 21:57 | FA5D-7823-CB23-5AEF | 7 | FALSE | FAILED |

FIG. 3A

| Disk Models | | | |
|---|---|---|---|
| Disk ID | Manufacturer | Model | Storage ID |
| 330→ FA5D-7823-CB23-5AEF | Seagate | ST1000DM003 | 47A6-67B5-1234 |
| 335→ 1245-DE82-AF45-B467 | Western Digital | WD1002FAEX | A4B9-1234-FFB3 |
| 340→ 789A-63BA-1245-FFB4 | Toshiba | PX3009E-1HP0 | 7855-AFF3-4279 |

FIG. 3B

| Storage System Models | | | |
|---|---|---|---|
| Storage ID | Manufacturer | Model | Disks |
| 345→ 47A6-67B5-1234 | EMC | VMAX | 5,760 |
| 350→ A4B9-1234-FFB3 | EMC | VMAX 10K/40K | 3,200 |
| 355→ 7855-AFF3-4279 | EMC | VNXe3200 | 150 |

FIG. 3C

| Survival Records | | | | |
|---|---|---|---|---|
| Disk ID | Initial NMEC | Date of NMEC | Survival Days | Bucket |
| 360→ FA5D-7823-CB23-5AEF | 5 | 01-25-2015 | 20 | 2 |
| 365→ 1245-DE82-AF45-B467 | 1 | 01-30-2015 | - | 1 |
| 370→ 789A-63BA-1245-FFB4 | 1 | 01-31-2015 | - | 1 |

FIG 3D

PREDICTION OF DISK FAILURE

TECHNICAL FIELD

This disclosure relates to the field of predicting failure of a hard disk or a system of hard disks.

BACKGROUND

Several known predictors of hard disk electromechanical failure include reallocated sectors, reallocated event counts, and current pending sector counts. Medium errors have not yet been studied as a predictor of disk failure rates.

When a physical problem is encountered when trying to read data from a hard disk, and multiple read attempts fail, the hard disk experiences a medium error. Medium errors can be classified as a "real medium error" or a "head failure". A real medium failure indicates a marginal disk platter or a loss of proper magnetic properties. A head failure occurs when the read/write header has deteriorated. Conditions that may cause such an error are external conditions (e.g. dust) physically harming the disk head, imprecision in the physical write location, or improper alignment. A sudden power failure may also cause a medium error, but this is typically limited to one sector in most cases. Most medium errors are head failures or a defect on the magnetic medium.

Although reallocated sectors have been studied as predictors of disk failure, not all medium errors result in reallocated sectors. Thus, using reallocation of sectors as a predictor of disk failures is an incomplete method of predicting disk failures.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 3A illustrates example attributes of a database of historic hard disk data used in determining a probability of failure of a hard disk in a storage system in accordance with some embodiments.

FIG. 3B illustrates example attributes of a database of hard disk models used in determining a probability of failure of a hard disk in a storage system in accordance with some embodiments.

FIG. 3C illustrates example attributes of a database of storage systems used in determining a probability of failure of a hard disk in a storage system in accordance with some embodiments.

FIG. 3D illustrates example attributes of a database of predictors used in determining a probability of failure of a hard disk in a storage system in accordance with some embodiments.

DETAILED DESCRIPTION

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Embodiments are described for determining a probability that a hard disk will fail based upon a date, and a count, of an initial non-zero medium error count (NMEC) reported for a hard disk. A data collection server can receive a customer report from a customer data center that one or more hard disks have reported an initial NMEC. The customer report can further include a manufacturer and model of each hard disk reporting an initial NMEC. A subsequent customer report from the customer data center can contain data indicating that one or more hard disks have failed. A data collection center can receive such customer reports from a wide customer base, thereby generating a substantial body of data that can be analyzed to generate a probability of failure of a hard disk based, at least in part, on a date and initial NMEC of a hard disk. A hard disk can be a part of a storage system comprising numerous hard disks. In an embodiment, the data collection center can generate a probability of failure that least one hard disk in a system of hard disks will fail, based at least in part on a current NMEC of a plurality of hard disks. In an embodiment, the data collection center can generate a probability of failure of a hard disk based at least in part on an initial NMEC and a manufacturer and model of the hard disk.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code. At least certain embodiments include an environment with a calling software component interacting with a called software component through an API. A method for operating through an API in this environment includes transferring one or more function calls, messages, other types of invocations or parameters via the API.

Figure 1:
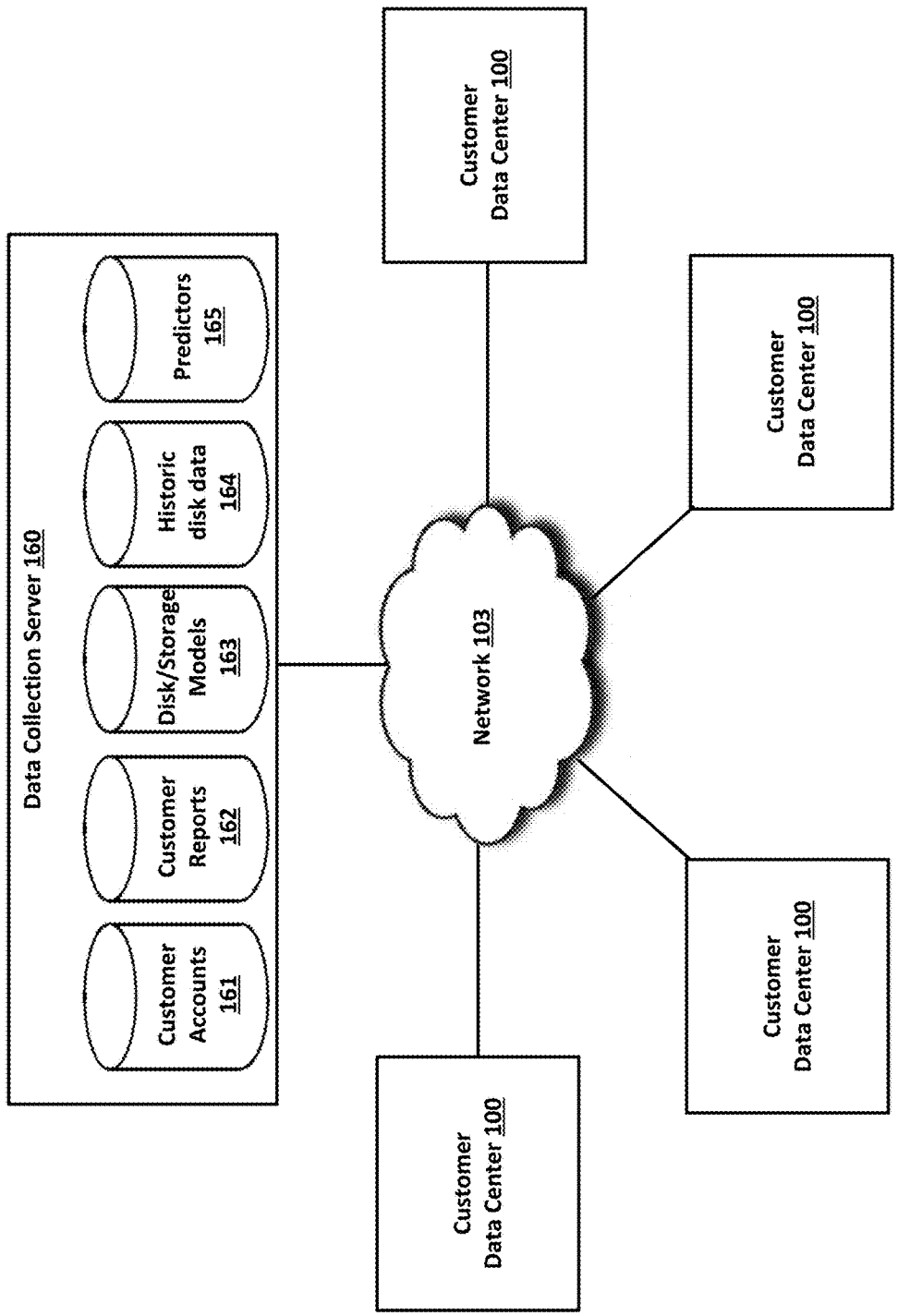
FIG. 1 illustrates, in block diagram form, an overview of a system for determining a probability a hard disk failure in a storage system in accordance with some embodiments.

FIG. 1 illustrates, in block diagram form, an overview of a system for determining a probability of a disk failure in a storage system in accordance with some embodiments.

A system for determining a probability of a disk failure in a storage system can include a plurality of customer data centers 100 that can communicate with a data collection server 160 via network 103.

A data collection server 160 can receive customer reports from one or more customer data centers 100. A customer report can include a report of at least one hard disk that has incurred an initial non-zero medium error count (NMEC) or has failed. A customer report can further include a unique identifier of a hard disk, a manufacturer and model of a hard disk, or a storage system manufacturer and model that the hard disk forms a part of.

Data collection server 160 can be comprise a plurality of databases, including a customer accounts database 161, a customer reports database 162, a disk and storage system models database 163, a disk historical data database 164, and a database of predictors 165 of a probability that a hard disk will fail after receiving an initial NMEC.

Databases 161-165 can be implemented on a computing system 1100 as described in FIG. 11, below. Database s 161-165 can be implemented using any database software, such as Microsoft SQL Server, Oracle, IBM DB2, SAP Sybase, and the like.

Customer database 161 can include a unique customer identifier, customer contact information, a list of storage systems and/or hard disks that the customer has installed at a customer data center 100. A customer report received by the data collection server 160 can include the customer identifier. The customer report can include a storage system identifier of a storage system the customer has installed at the customer data center 100. The customer reports can further include an identifier of a hard disk that forms a part of the storage system. From the foregoing information, the data collection center 160 can look up the hard disk manufacturer and model so that the data collection center 160 can record the hard disk manufacturer and model with, along with the report of an initial NMEC or failure for the hard disk.

Customer reports database 162 can include a date/time stamp that a report was generated by the customer data center, a date/time stamp that the report was received by the data collection center 160, a customer identifier, a customer data center identifier, a storage system identifier and a hard disk identifier so that the data collection server 160 can generate records for the disk statistics database 164 for a hard disk that is as specific as possible, from the customer report.

A disk/storage models database 163 record can include a field for a storage system identifier that uniquely identifies particular instance of a storage system, its manufacturer, and the particular model of storage system, e.g. EMC® VNXe3200. Disk/storage models database 163 can further include records that identify particular models of hard disks, e.g. Seagate ST1000DM003. Hard disk model records may include a field for a unique identifier of a hard disk, the manufacturer of the hard disk, and particular model of the hard disk.

A hard disk historic data database 164 can store historic data about a plurality of hard disks. A hard disk record can be generated for the hard disk historic data database 164 in response to parsing a customer report to obtain hard disk initial NMEC and failure information. In an embodiment, a new record can be generated for each instance of a customer report for a hard disk. For example, a record may be generated in the hard disk historic data database 164 when a customer reports that a specific hard disk reports an initial NMEC. An additional record can be generated for the same hard disk if a subsequent report indicates that the NMEC for the hard disk has increased. Yet another record may be generated for the same hard disk if a subsequent report indicates that the hard disk FAILED. Alternatively, or in addition, a single record may be generated representing the life of a hard disk. The record can store the date and initial NMEC, then be updated with the date of the failure of the hard disk when the failure is reported in a future customer report.

A predictors database 165 can store records including probabilities of failure of a hard disk, determined from historic hard disk data, that can be used to determine a probability that a hard disk will fail, given an initial NMEC and date of the initial NMEC. In an embodiment, the probability that a hard disk will fail can be based at least in part on the manufacturer and model of hard disk that incurred the initial NMEC. Predictors 165 can be generated by analyzing a selected set of historical data records from the disk historic data database 164.

Figure 2:
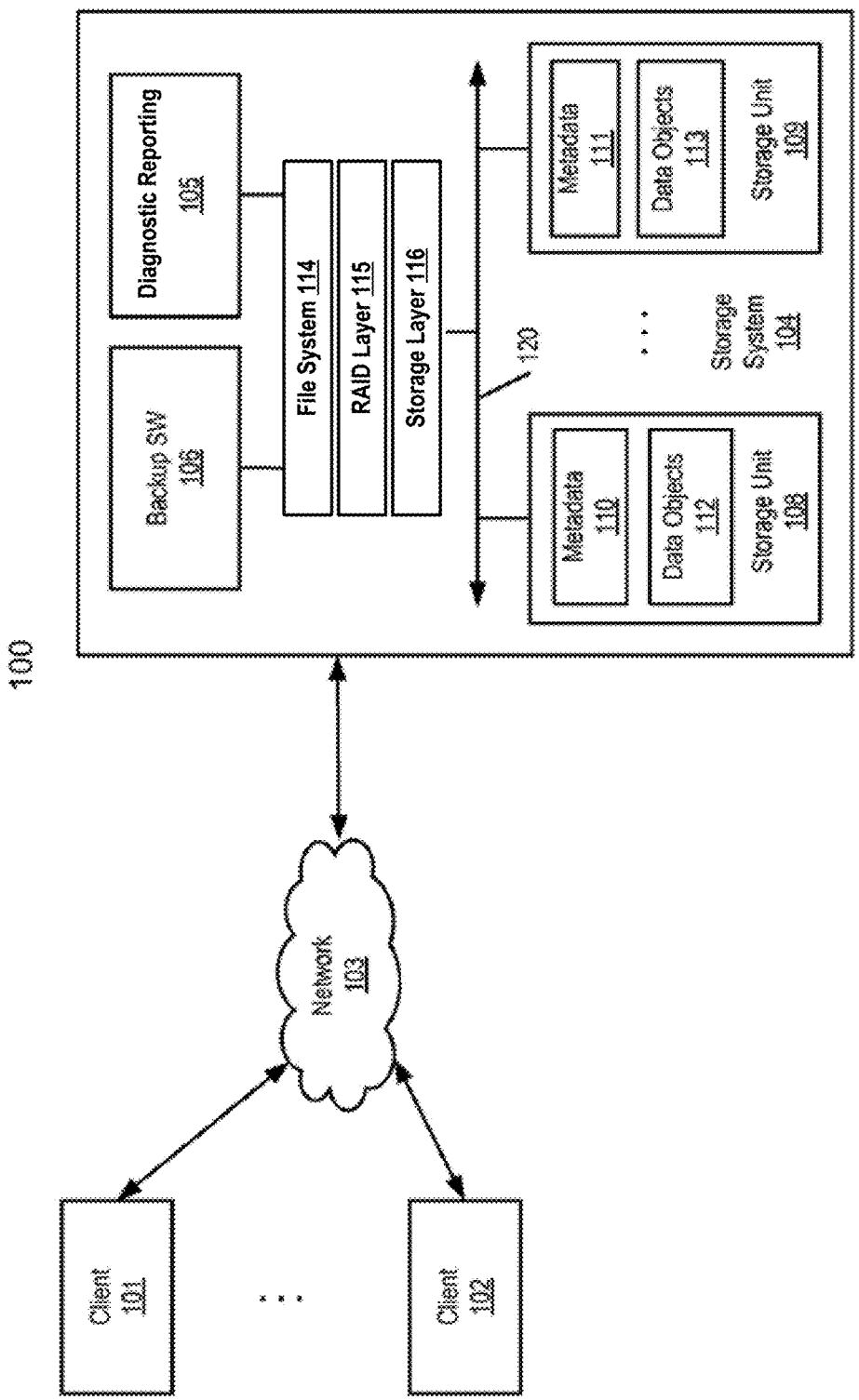
FIG. 2 illustrates, in block diagram form, an exemplary customer data center in a system for determining a probability of a hard disk failure in a storage system in accordance with some embodiments.

FIG. 2 illustrates, in block diagram form, an exemplary customer data center 100 in a system for determining a probability of a disk failure in a storage system in accordance with some embodiments.

A customer data center 100 can include one or more client computers, e.g. 101 and 102, connected to a storage system 104 via network 103. Each client device, e.g. 101 and 102, can be implemented using a computing system 1100 as described below with reference to FIG. 11. Similarly, storage system 104 can be implemented using a computing system 1100 as described below with reference to FIG. 11.

Storage system 104 can be a primary storage or a backup storage comprising a plurality of storage units, e.g. 108 and 109. In an embodiment, a storage unit can be a hard disk. In an embodiment, a storage unit can comprise a plurality of hard disks. Storage system 104 can include backup software 106 and can further include diagnostic reporting module 105. Diagnostic reporting module 105 can generate a customer report and transmit the customer report to the data collection server 160 via network 103.

Storage system 104 can include a bus or communication path 120 that allows backup software 106 and diagnostic reporting module 105 to access the plurality of storage units, e.g. 108 and 109. Each storage unit may read and/or write metadata and storage objects, e.g. metadata 110 and 111, and storage objects 112 and 113.

In an embodiment, a storage layer 116 can provide a first level of abstraction of the storage units, e.g. 108 and 109. In an embodiment, the plurality of storage units may comprise a redundant array of independent disks (RAID), managed by a RAID layer 115 over the storage layer 116. In an embodiment, a file system 114 can be a next higher level of abstraction implemented on the RAID layer 115 and, in turn, upon the storage layer 116.

Storage layer 116 can report a medium error count for a hard disk in a storage unit and whether a hard disk has failed. Diagnostic reporting module 105 can receive the medium error count for the hard disk from the storage layer 116. In an embodiment, RAID layer 115 can report diagnostic information, including whether a hard disk has failed, medium error count, reallocated sector count, and other hard disk information, via Self-Monitoring and Analysis Reporting Technology (S.M.A.R.T.).

FIG. 3A illustrates example attributes of a database of historic hard disk data used in determining a probability of failure of a disk in a storage system in accordance with some embodiments.

As described above with reference to FIG. 1 and FIG. 2, a customer data center 100 can include a plurality of storage systems 104 each having a plurality of hard disks or "storage units" 108 and 109. A diagnostic reporting module 105 can generate customer reports that contain hard disk diagnostic data such as an initial non-zero medium error count (NMEC) for a hard disk, the date that the initial NMEC was detected, and the status of the hard disk, such as ALIVE or FAILED. The customer report can be transmitted to data collection server 160 where the customer report can be stored in a customer reports database 162. The data collection server 160 can parse the customer report into hard disk data and store data in database records 164. Customer reports can be transmitted by a customer data center 100 on a periodic basis, such as each day, or upon detection of new or changed hard disk data. For example, a customer report may be generated when an initial NMEC is detected for a particular hard disk. At a different date or time, a customer report may be generated for the particular hard disk when it is detected that the hard disk has failed.

Data collection server 160 can receive customer reports for a plurality of customer data centers 100, from a plurality of different customers, each having different storage systems and hard disks, distinct from other customers or customer data centers.

Referring to FIG. 3A, a first database record 305 for a hard disk can indicate a date/time that the hard disk incurred an initial NMEC, and a count of the initial NMEC for the hard disk. Additionally, the status "ALIVE" may be recorded for the hard disk. At a later time, a next database record 320 may record that the hard disk is still alive and the NMEC for the hard disk has increased to 6. At a still later time, a third database record 325 may record that the hard disk NMEC increased to 7 and the disk status has changed to FAILED. Also shown in FIG. 3A, two other records 310 and 315 have been generated from one or more customer reports indicating a respective date/time that each hard disk incurred an initial NMEC of 1.

At a later time, these three database records may be processed into a single record for the hard disk as described with reference to FIG. 3D, below.

FIG. 3B illustrates example attributes of a database of hard disk models used in determining a probability of failure of a disk in a storage system in accordance with some embodiments.

Disk historic data database 164 records can each reference a specific manufacturer and model of hard disk. In an embodiment, the disk identifier of FIG. 3A can act as an index into a database of hard disk models 163. Disk model record 330 illustrates that the disk identifier for hard disk historic data database 164 records 305, 320, and 325 is a Seagate model ST1000MD0003. Hard disk historic data database 164 records 310 and 315 reference hard disk model records 335 (Western Digital model WD1002FAEX) and 340 (Toshiba model PX3009E-1HP0), respectively. In an embodiment, a particular disk may reference a particular storage system via a storage identifier.

FIG. 3C illustrates example attributes of a database of storage systems used in determining a probability of failure of a disk in a storage system in accordance with some embodiments.

A hard disk may often form a portion of a storage system, such as a redundant array of independent disks (RAID) or other storage system comprising a plurality of disks. For example, as indicated in disk model database record 330, and storage system models 345, the Seagate hard disk indicated in FIG. 3B reference 330 forms a part of storage system 345: an EMC® VMAX storage system having up to 5,760 hard disks. Similarly, the Western Digital hard disk in model record 335 forms a part of a storage system 350: an EMC® VMAX 10K/40K with up to 3,200 hard disks. By associating a particular hard disk with a storage system, a probability that one or more hard disks in a storage system will fail can be determined.

FIG. 3D illustrates example attributes of a database of survival records used in determining a probability of failure of a disk in a storage system in accordance with some embodiments.

Disk historic database records 164 illustrated in FIG. 3A can be analyzed and consolidated into a single database record for each hard disk. For example, in FIG. 3A, database records 305, 320, and 325 for the hard disk having identifier FA5D-7823-CB23-FAEF can be consolidated into a single record 360 indicating the initial non-zero medium error count (NMEC) and the number of days that the hard disk survived after the initial NMEC. Based upon the initial NMEC value, a statistical category or "bucket" can be assigned to the hard disk survival record, e.g. 360. For record 360, the initial NMEC count can be obtained from historic hard disk data database 164 record 305. For record 360, the survival days after initial NMEC can be determined from the date/time stamp on database record 305 and the database record 325 that indicated the date that the hard disk failed. The bucket value of 2, for record 360, can be based on a statistical category or bucket, e.g., a first bucket can group hard disks having an initial NMEC of 1, a second bucket can group hard disks having an initial NMEC of 2-10, and a third bucket can group hard disks having an initial NMEC of 11 or more.

As shown in FIG. 3A, record 310, and in FIG. 3D, record 365, the hard disk having disk identifier 1245-DE82-AF45-B467 has incurred an initial NMEC of 1 and has not yet failed. The record 365 can be used to statistically represent an instance of a hard disk that has incurred an initial NMEC, on an identified date, but has not yet failed.

Figure 4:
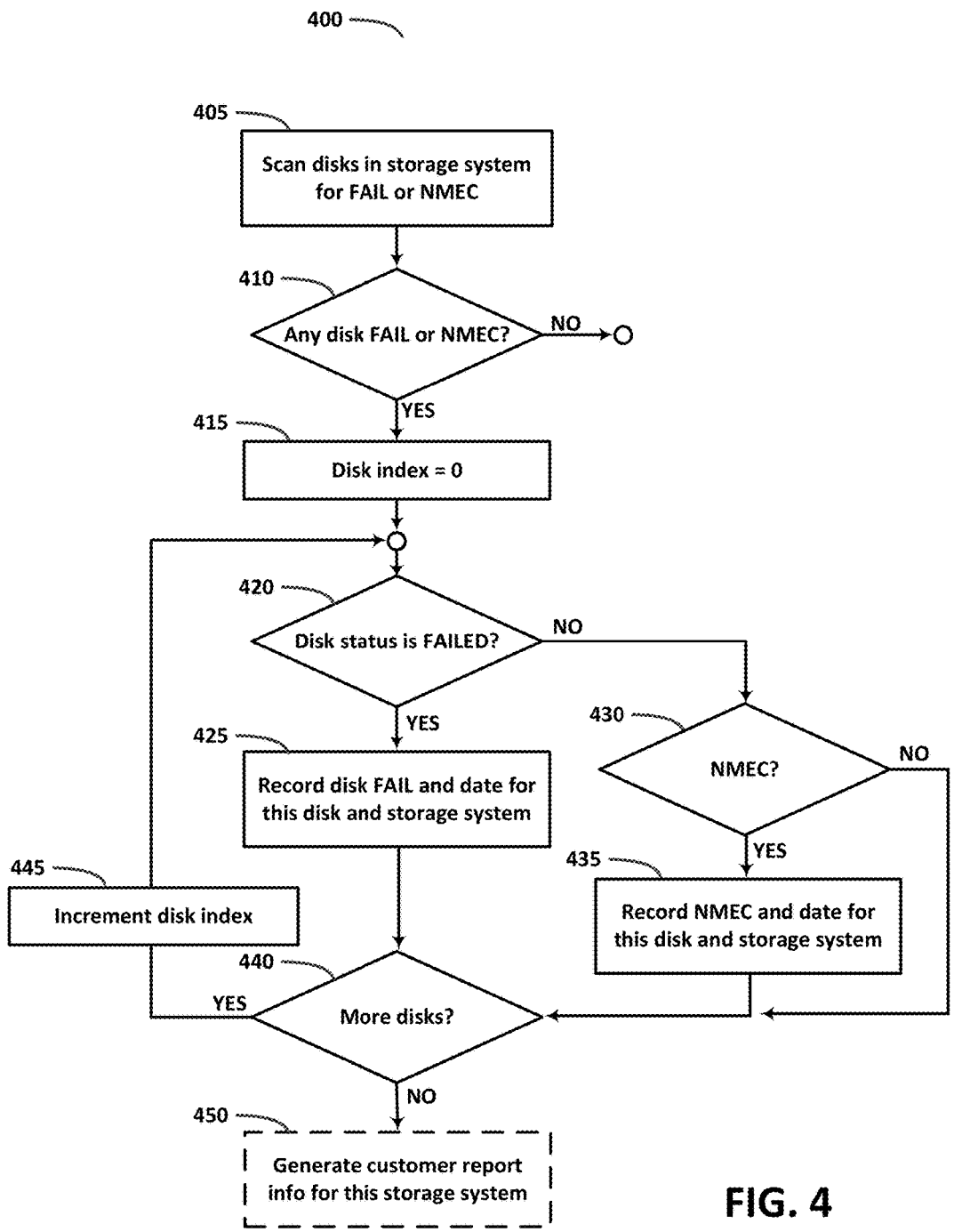
FIG. 4 illustrates a flow chart of a method for generating hard disk data for determining a probability of failure of a disk in a storage system in accordance with some embodiments.

FIG. 4 illustrates a flow chart of a method 400 for generating hard disk historic data for determining a probability of failure of a disk in a storage system in accordance with some embodiments.

In operation 405, a computing system can scan one or more hard disks within the computing system. The one or more hard disks may form part of a storage system 104. Scanning the one or more hard disks can include detecting whether or not a hard disk has failed, and whether or not a hard disk has incurred a non-zero medium error count (NMEC).

In operation 410, if none of the one or more hard disks has failed or has a non-zero medium error count, then the method 400 ends. Otherwise, the method 400 continues at operation 415.

In operation 415, a disk index is set to an initial value, such as zero (0). Hard disks in a storage system 104 often comprising a redundant array of independent disks (RAID) system. Scanning a hard disk of a RAID system can include scanning, sequentially, through the hard disks that make up the RAID system and incrementing the disk index to scan a next hard disk.

In operation 420, it is determined whether the hard disk currently being scanned has failed. If so, then in operation 425, the method can record the failure of this hard disk, and optionally record the storage system that the hard disk being scanned forms a part of. Recording the failure can include generating a line item in a customer report that reports the failure, including a disk identifier of the failed disk, the date that the disk failed, and optionally an identifier of the storage system. After operation 425, the method resumes at operation 440.

If, in operation 420, it is determined that the hard disk being scanned has not failed, then in operation 430 it can be determined whether the hard disk has a non-zero medium error count (NMEC). If so, then in operation 435, the NMEC and date that the NMEC occurred can be recorded. In an embodiment, scanning the hard disk can determine that the NMEC is an initial NMEC, being reported for the first time. In an embodiment, determining whether an NMEC is an initial NMEC for the hard disk being scanned can be determined by the data collection server 160 at a later time. The method resumes at operation 440.

In operation 440, it can be determined whether there are more hard disks to scan. If so, then the method resumes at operation 445, otherwise the method resumes at operation 450.

In operation 445, the disk index is incremented, and the next disk is scanned. The method resumes at operation 420.

In operation 450, the method can optionally generate a customer report to send to the data collection server 160. The customer report can indicate a line item for each hard disk that either had a status of "failed" or had an NMEC, and the date that the failed status or NMEC occurred. As described above, the report can optionally indicate whether the NMEC is an initial NMEC. In an embodiment, the customer report can further include a date that the initial NMEC for a hard disk occurred.

Data collection server 160 can receive the customer report and store the customer report in customer report database 162. Data collection server 160 can further parse the line items in the report, and generate database records for the disk historic database 164 that record the failed status or initial NMEC, and data of occurrence, for the hard disk along with the hard disk unique identifier.

FIGS. 5A through 5D illustrate results of a study of over 50,000 hard disks that received and reported an initial non-zero medium error count (NMEC) many of which subsequently failed. FIGS. 5A-5D illustrate several embodiments for predicting hard disk failure using an initial NMEC. Embodiments include analyzing hard disk failures for all hard disks using categories for initial NMECs of 1 NMEC, 2-10 NMEC, and 11 and more NMECs. More, or fewer, or different categorizations can be used. Hard disk failures can be analyzed for all hard disks, or by particular manufacturers, or manufacturers and models. Hard disk failures can also be analyzed based upon categories, or "buckets" of how long a hard disk survived after an initial NMEC, such as 1 day, 7 days, 30 days, 60 days, or longer than 60 days survival after an initial NMEC.

Figure 5A:
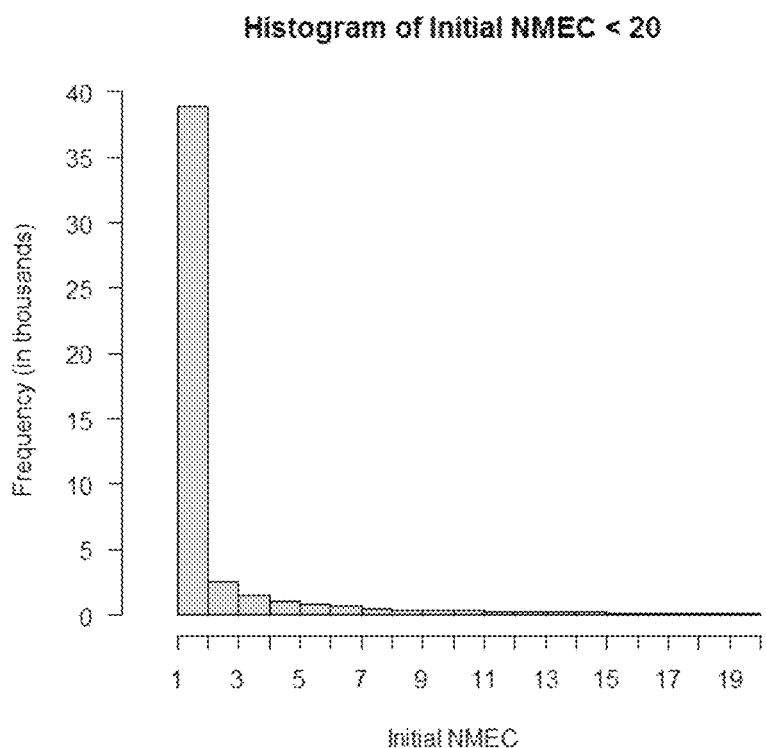
FIG. 5A illustrates a histogram that illustrates a frequency of occurrence of initial non-zero medium error counts (NMECs) of hard disks in accordance with some embodiments.

FIG. 5A illustrates a histogram that illustrates a frequency of occurrence of initial non-zero medium error counts (NMECs) of hard disks in accordance with some embodiments.

As shown in FIG. 5A, a vast majority of initial NMECs are less than 10. Due to the variability in the initial NMEC, it is worthwhile to calculate the survival probabilities conditioning on the initial non-zero medium error count, not simply the existence of a non-zero medium error count. In an embodiment, the following statistical categories, or "buckets" are used to capture a sufficient number of disks for each category. The first bucket groups together all hard disks having an initial NMEC of 1, the second bucket groups together all hard disks having an initial NMEC from 2 to 10, and the third bucket groups together all hard disks having an initial NMEC of 11 or more.

Figure 5B:
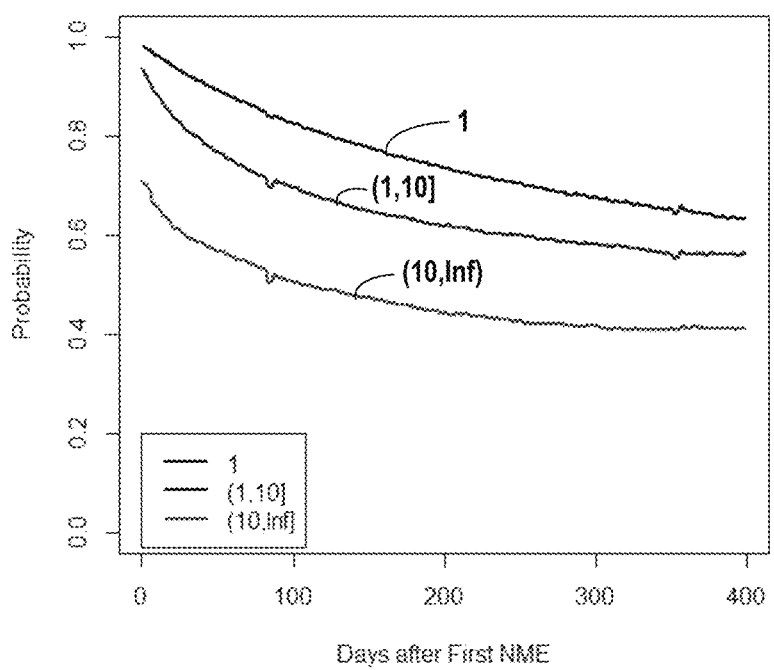
FIG. 5B illustrates a survival probability of hard disks having different classifications of NMECs in accordance with some embodiments.

FIG. 5B illustrates a survival probability of hard disks having different categories, or "buckets," of NMECs in accordance with some embodiments.

As shown in FIG. 5B, there is a marked difference in the survival functions of hard disks depending on the initial NMEC itself. A disk with an initial NMEC>10 has a 27.8% chance of failure within the first day, a 32.9% chance of failure within the first week, and a 40.14% chance of failure within the first month.

Figure 5C:
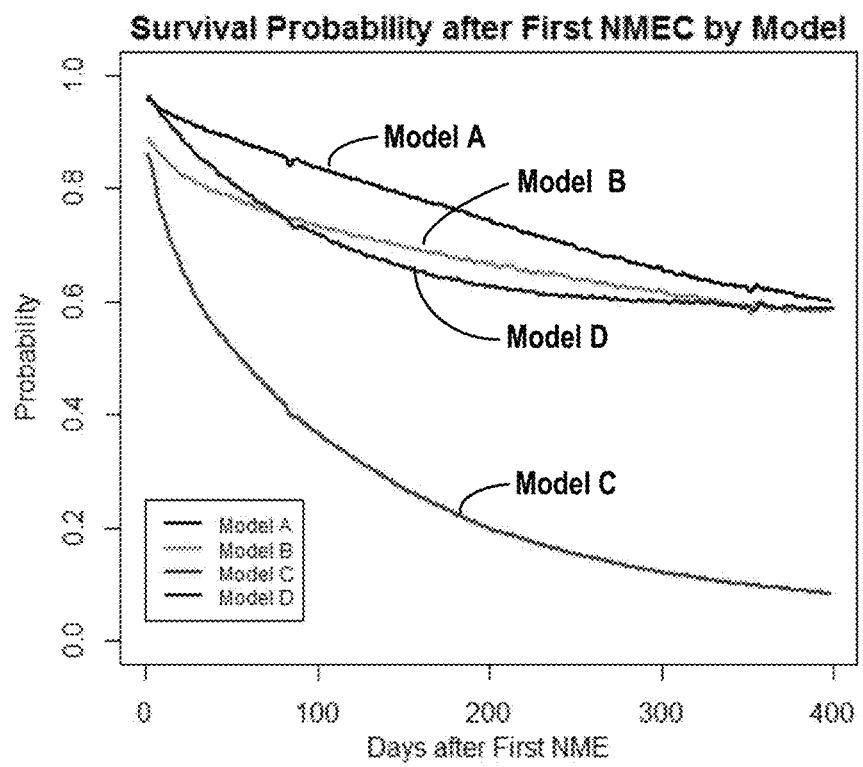
FIG. 5C illustrates a number of days that different models of hard disk survival after an initial NMEC in accordance with some embodiments.

FIG. 5C illustrates a number of days that different models of hard disk survive after an initial NMEC, in accordance with some embodiments. As shown in Table 1, below, different models of hard disks have different survival functions for different initial NMECs.

TABLE 1

| | NMEC bucket | | |
| --- | --- | --- | --- |
| Model | 1 | (1,10] | (10,∞) |
| A | 60.17% | 25.52% | 14.31% |
| B | 69.27% | 21.77% | 8.86% |
| C | 56.87% | 34.23% | 8.9% |
| D | 69.35% | 21.77% | 8.8% |

Referring to Table 1, and FIG. 5C, it can be seen that hard disk model A has a better survival function for each initial NMEC bucket than, e.g., model C.

Figure 5D:
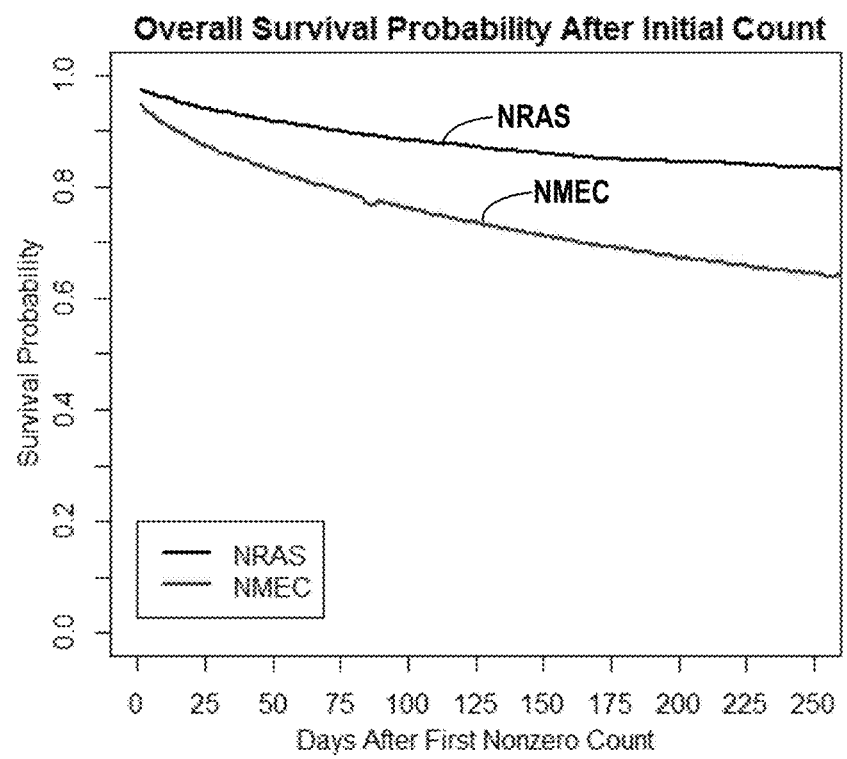
FIG. 5D illustrates a comparison of an overall initial survival function with an overall initial NRAS survival function in accordance with some embodiments.

FIG. 5D illustrates a comparison of an overall survival probability after receiving an initial NMEC to survival probability vs. a survival probability after receiving an initial non-zero reallocation of sectors count (NRASC). As previously stated, use of an initial NRASC has been studied as a predictor of hard disk failure. We can see from FIG. 5D that using an initial NMEC, approximately 7.9% of hard disks fail within the first week of their initial NMEC, and approximately 13.77% of hard disks fail within a month of their initial NMEC. In comparison, only 5.5% of hard disks fail within the first week of their initial NRASC, and 11% of hard disks fail within the first month of their initial NRASC. Thus, use of an initial NMEC is a better predictor of a hard disk failure than using an initial NRASC. Data protection is enhanced by avoiding hard disk failure. Accordingly, using an initial NMEC to predict hard disk failure is a better way to enhance data protection than using an initial NRASC.

Figure 6:
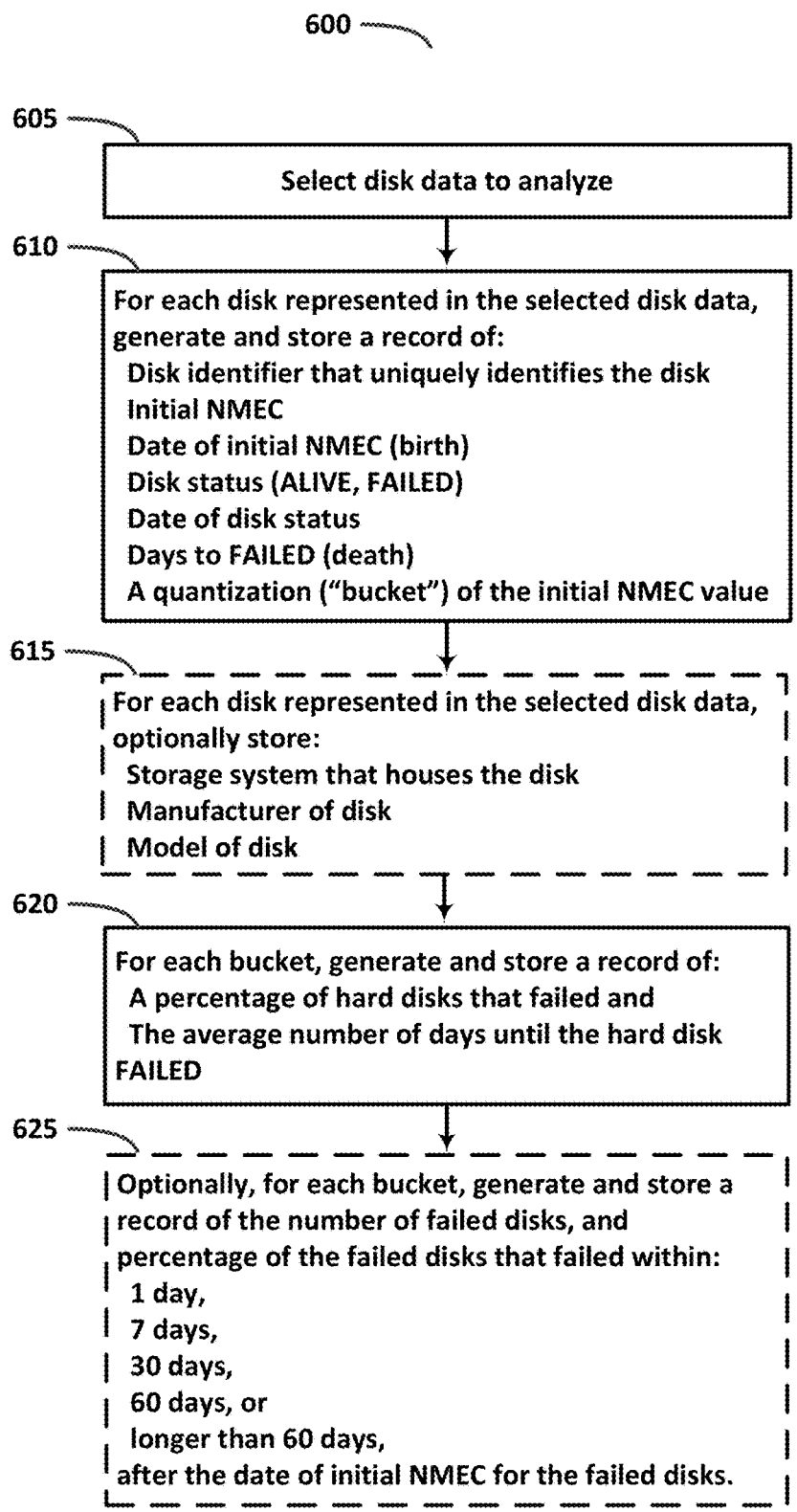
FIG. 6 illustrates a flow chart of a method of analyzing hard disk data for use in determining a probability of failure of a hard disk according to some embodiments.

FIG. 6 illustrates a flow chart of a method 600 of analyzing hard disk data for use in determining a probability of failure of a hard disk according to some embodiments. Method 600 can read hard disk historic data records 164, analyze the records, and generate predictors 165 that can be used to determine a probability of failure of a hard disk.

In operation 605, hard disk data is selected for analysis from the hard disk database 164. In an embodiment, the selection can be limited to a particular hard disk manufacturer and model. In an embodiment, the selection can incorporate all hard disks used in a particular manufacturer and model of storage system. In an embodiment, the selection can include all hard disk data for all hard disks of all manufacturers stored within the hard disk database 164. For convenience in processing, the selection may be sorted by a specific criteria, such as by manufacturer then by model, or by unique disk identifier.

In operation 610, for each hard disk represented by the selection of historic hard disk data, a record is generated and stored for that hard disk, with information including a unique hard disk identifier, and initial NMEC, a date of the initial NMEC, a status of the hard disk (ALIVE or FAILED), a date of the status of the hard disk, and a statistical category or bucket of the initial NMEC for the hard disk. Example records are shown and described with reference to FIG. 3D. In an embodiment, a first bucket may group together hard disks having an initial NMEC of 1, a second bucket may group together hard disks having an initial NMEC of 2-10, and third buck may group together hard disk having an initial NMEC of 11 or more.

In operation 615, for each hard disk represented by the selection of hard disk data, the record can optionally store an indication of the storage system that houses the hard disk, a manufacturer of the hard disk, and a model of the hard disk. These fields can be used to make manufacture- and model-specific probability of failure determinations.

In operation 620, for each statistical bucket, a record can be generated and stored in the predictors database 165 indicating a percentage of hard disks in the bucket that failed and the average number of days after the initial NMEC that the hard disk failed, if it failed.

In operation 625, optionally, for each statistical bucket, a record can be generated and stored in the predictors database 165 indicating a percentage of hard disks that failed within 1 day, 7 days, 30 days, 60 days, or longer than 60 days, after the date of the initial NMEC for the hard disk.

Figure 7:
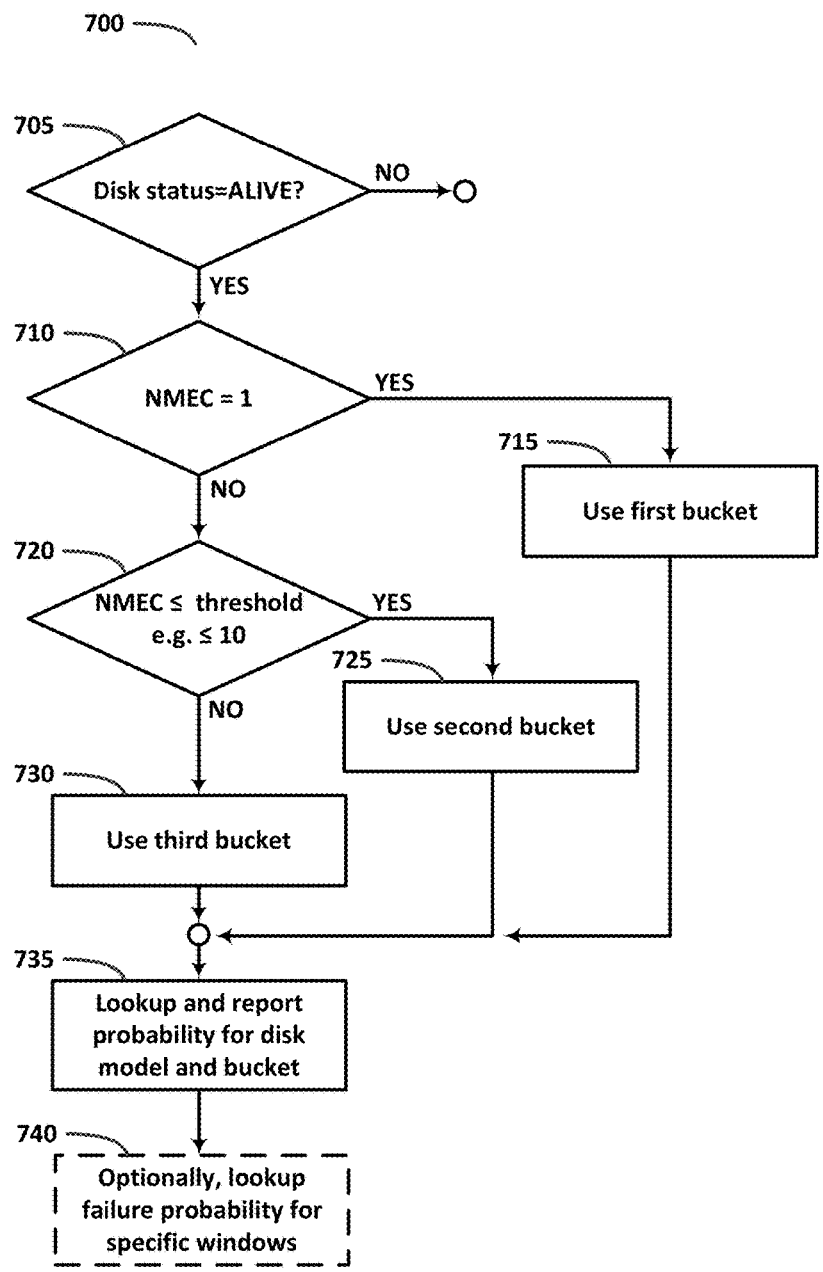
FIG. 7 illustrates a flow chart of a method for determining a probability of failure of a disk in storage system in accordance with some embodiments.

FIG. 7 illustrates a flow chart of a method 700 for determining a probability of failure of a disk in storage system in accordance with some embodiments. As a threshold matter, each hard disk under analysis, for which a probability of failure is being determined, is presumed to have incurred an initial NMEC.

In operation 705, it can be determined whether the status of a hard disk is "alive" (i.e., not failed). If the hard disk has already failed (i.e. is not alive), then the method 700 ends because the probability of the hard disk failing is already 100% because the hard disk status is "failed."

In operation 710, it can be determined whether the initial NMEC for the hard disk is equal to value range that defines a first classification or bucket for analysis. For example, a first bucket may include only hard disks that have an NMEC of 1. If so, then in operation 715 the hard disk is classified for analysis in the first bucket, and the method continues at operation 735. Otherwise, the method continues at operation 720.

If, in operation 720, the initial NMEC for the hard disk falls within a value range that defines a second classification or bucket for analysis, then in operation 725 the hard disk is classified for analysis in the second bucket, and the method continues at operation 735. Otherwise the hard disk is classified within a third classification having a third initial NMEC value range. The method continues at operation 735.

In operation 735, based upon the classification by initial NMEC value (first, second, or third bucket), a probability of survival of the hard disk can be looked up in the predictors database 165. In an embodiment, the probability is also dependent upon the particular manufacturer and model of the hard disk.

In operation 740, optionally, the probability that the hard disk will survive for a predetermined number of days can be looked up. In an embodiment, the predetermined number of days can be 1 day, 7 days, 30 days, 60 days, or longer than 60 days.

Figure 8:
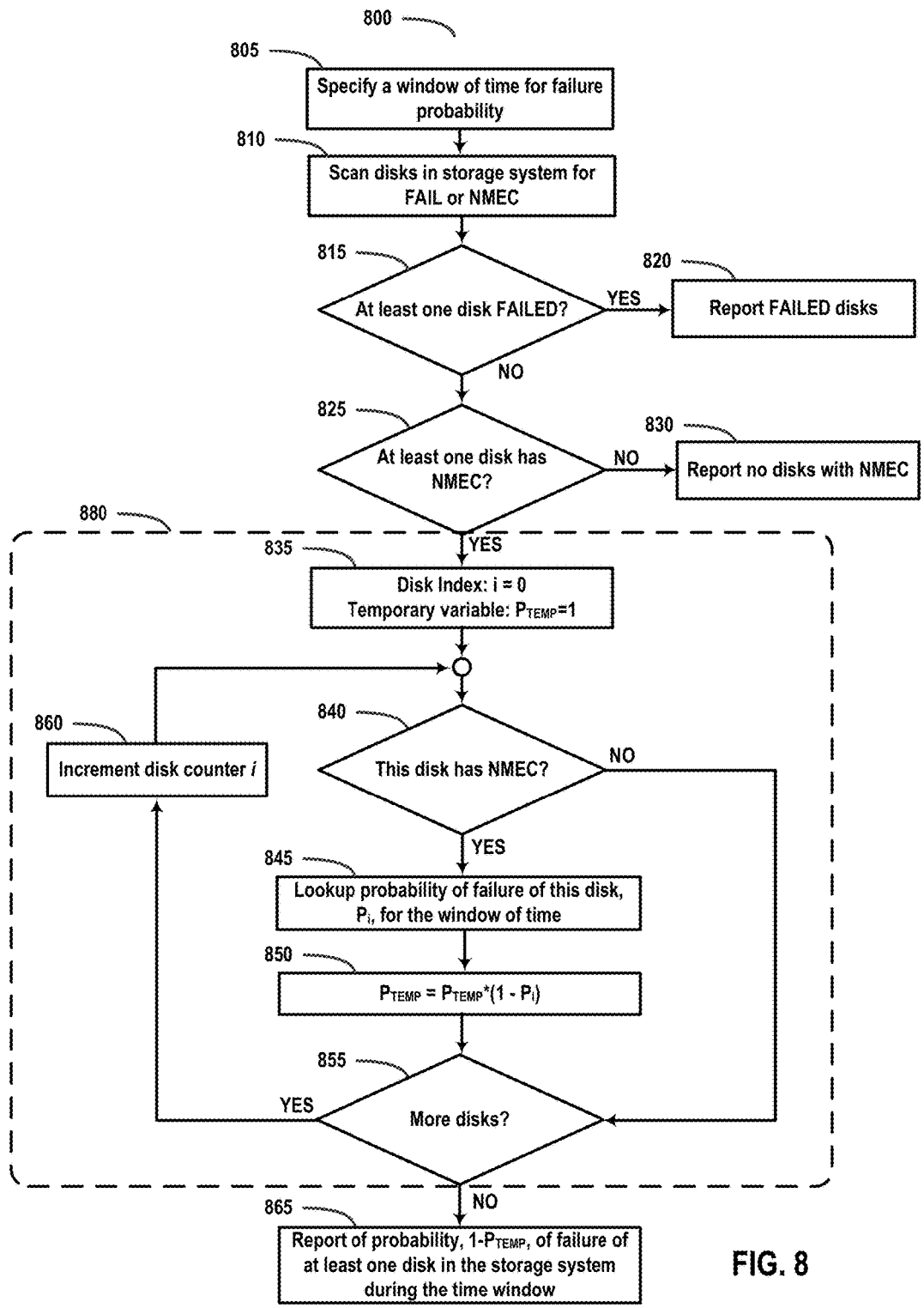
FIG. 8 illustrates a flow chart of a method of determining a probability of failure of at least one hard disk in a storage system having a plurality of hard disks according to some embodiments.

FIG. 8 illustrates a flow chart of a method 800 of determining a probability of failure of at least one hard disk in a storage system having a plurality of hard disks according to some embodiments. In an embodiment, a current NMEC, and current date, can be used in lieu of an initial NMEC and initial NMEC data. The method 800 can use predictors in the predictors database 165 generated from historic hard disk database 164 in conjunction with information about the current state of a plurality of hard disks in a storage system. The probability of failure of at least one hard disk in a storage system having a plurality of hard disks, $P(F \geq 1)$, for a storage system having n hard disks, can be determined as follows:

$$P(F \geq 1) = \Pi_{i=1}^{n}(1-Pi), \text{ where:}$$

$Pi$=probability of failure of disk i within the time window, e.g. 30 days.

$1-Pi$=probability of survival of disk i within the time window.

$\Pi_{i=1}^{n}(1-Pi)$=probability of survival of all n disks within the time window.

$1-\Pi_{i=1}^{n}(1-Pi)$=probability failure of at least one hard disk in the storage system within the time window.

Table 2, below, illustrates an example computation for a storage system having four hard disks (n=4), determining a probability that at least one hard disk will fail during the next 30 days, assuming initial NMEC values as shown.

TABLE 2

| Disk | NMEC | Pi | 1 − Pi |
|---|---|---|---|
| 1 | 1 | 0.0770 | 0.9230 |
| 2 | 3 | 0.1880 | 0.8120 |
| 3 | 0 | 0.0000 | 1.0000 |
| 4 | 5 | 0.1880 | 0.8120 |

Thus, $\Pi_{i=1}^{n}(1-Pi) = (0.9230)*(0.8120)*(1.000)*(0.8120) = 0.6086.$ $P(F \geq 1) = 1 - \Pi_{i=1}^{n}(1-Pi) = 1.0000 - 0.6086 = 0.3914$ In operation 805, a window of time for the probability of failure can be specified. For example, the method can determine the probability that one or more hard disks in the storage system will fail within 30 days, based upon the current status of the hard disks in the storage system.

In operation 810, the hard disks within the storage system can be scanned to determine whether any, all, or none of the hard disks has incurred an initial NMEC or a failure.

In operation 815, it can be determined whether at least one hard disk in the storage system has failed. If so, then in operation 820, the failed hard disk(s) can be reported and the method 800 ends. Otherwise, the method resumes at operation 825.

In operation 825, it can be determined whether at least one hard disk in the storage system has an NMEC. If so, then in operation 830, it can be reported that there are no hard disks with an NMEC, and the method 800 ends. Otherwise the method resumes at operation 835.

In operation 835, a disk index can be set to an initial value, such as 0 or 1, to loop through all disks in the storage system. A temporary variable, $P_{TEMP}$ is initialized to a value of 1. After the method loops through all disks in the storage system, $P_{TEMP}$ represents the probability of survival of all disks in the storage system: $\Pi_{i=1}^{n}(1-Pi)$.

In operation 840, it can be determined whether disk i has an NMEC. For purposes of the calculations in method 800, the current NMEC and current date can be used as an estimate for the initial NMEC and date of initial NMEC. If disk i has does not have an initial NMEC, then the method 800 continues at operation 855, otherwise the method 800 continues at operation 845.

In operation 845, the NMEC, and optionally and additionally the disk manufacturers and model, can be used to look up a probability Pi that the $i^{th}$ disk will fail within the time window, e.g. 30 days. In an embodiment, a customer data center 100 can perform method 800, and can request that the data collection server 160 lookup the probabilities in the databases of the data collection server 160, on behalf of the customer data center 100.

In operation 850, $P_{TEMP}$ can be updated to reflect the probability that none of the first i disks will fail within 30 days.

In operations 855, it can be determined whether there are more disks to consider in the storage system. If so, then the method resumes at operation 860, where the disk index i can be incremented.

In operation 865, a report can be generated and transmitted to the customer data center 100 as to the probability of failure of at least one disk in the storage system during the time window.

Figure 9:
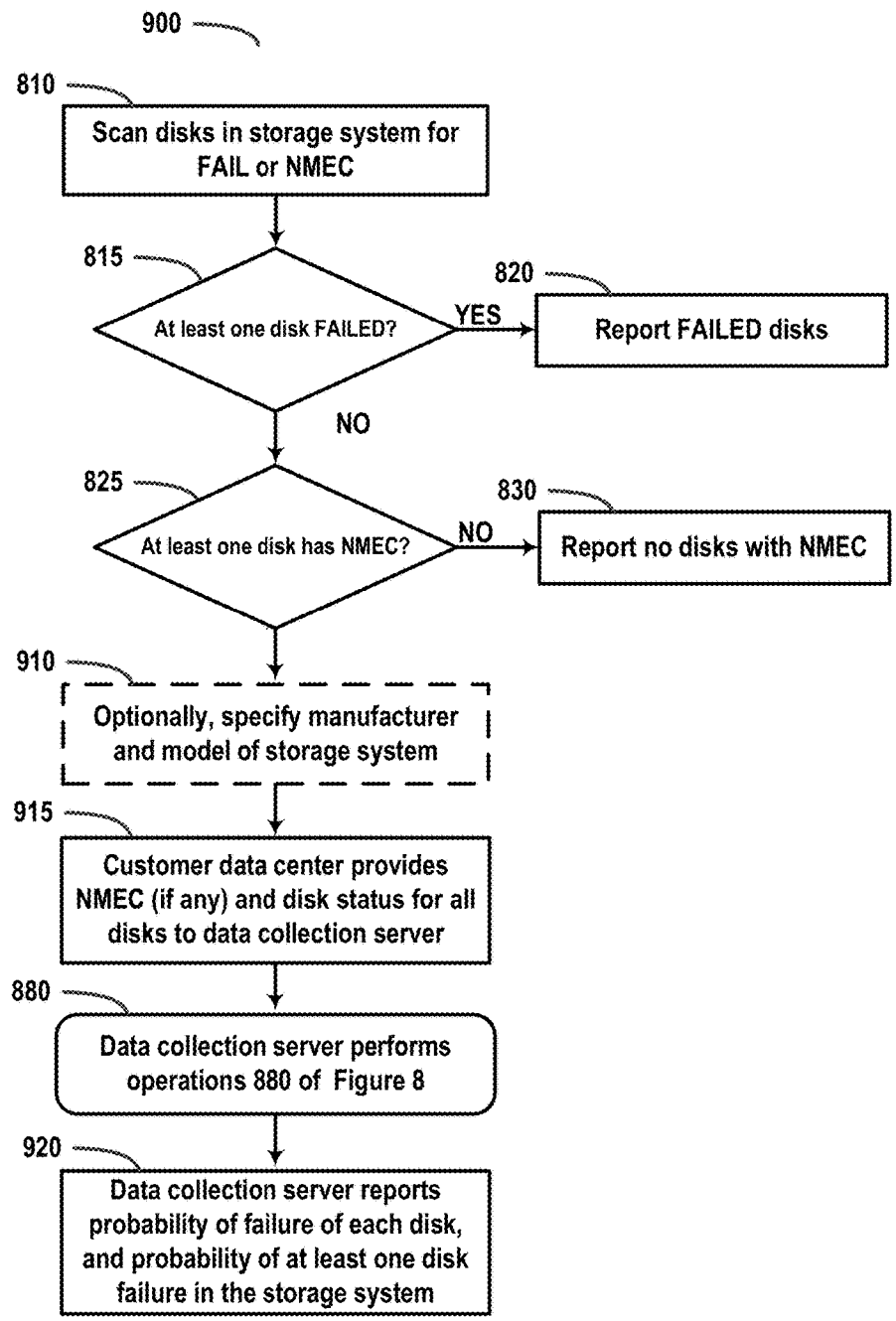
FIG. 9 illustrates a flow chart of a method of determining a probability of failure of at least one hard disk in a storage system having a plurality of hard disks according to some embodiments.

FIG. 9 illustrates a flow chart of a method 900 of determining a probability of failure of at least one hard disk in a storage system having a plurality of hard disks according to some embodiments. Some of the operations in method 900 are duplicated from method 800, of FIG. 8. In method 900, a customer data center 100 can scan the hard disks in a storage system 104, send a customer service request to the data collection server 160, requesting that the data collection center 160 perform a probability of failure calculation for the storage system 104 on behalf of the customer data center 100.

In operation 810, customer data center 100 can scan the hard disks within the storage system to determine whether any, all, or none of the hard disks have incurred an initial NMEC or a failure.

In operation 815, the customer data center 100 can determine whether at least one hard disk in the storage system has failed. If so, then in operation 820, the failed hard disk(s) can be reported and the method 900 ends. Otherwise, the method resumes at operation 825.

In operation 825, the customer data center 100 can determine whether at least one hard disk in the storage system has an NMEC. If so, then in operation 830, it can be reported that there are no hard disks with an NMEC, and the method 900 ends. Otherwise the method resumes at operation 930.

In operation 910, customer data center 100 can optionally provide the manufacturer and model of the storage system housing the hard disks being scanned to the data collection center, so that a probability calculation can be manufacturer and model-specific. Alternatively, or in addition, the customer data center 100 can provide a manufacturer and model of each disk scanned in the storage system, to the data collection server 160.

In operation 915, the customer data center 100 can provide the NMEC (if any) and disk status for all hard disks scanned in the storage system to the data collection server 160.

In operation 880, the data collection server performs a subset 880 of the operations of method 800 in FIG. 8.

In operations 920, data collection server 160 reports to the customer data center 100 a probability of failure of each hard disk scanned and a probability of failure of at least one hard disk failure in the storage system of the hard disks scanned.

Figure 10:
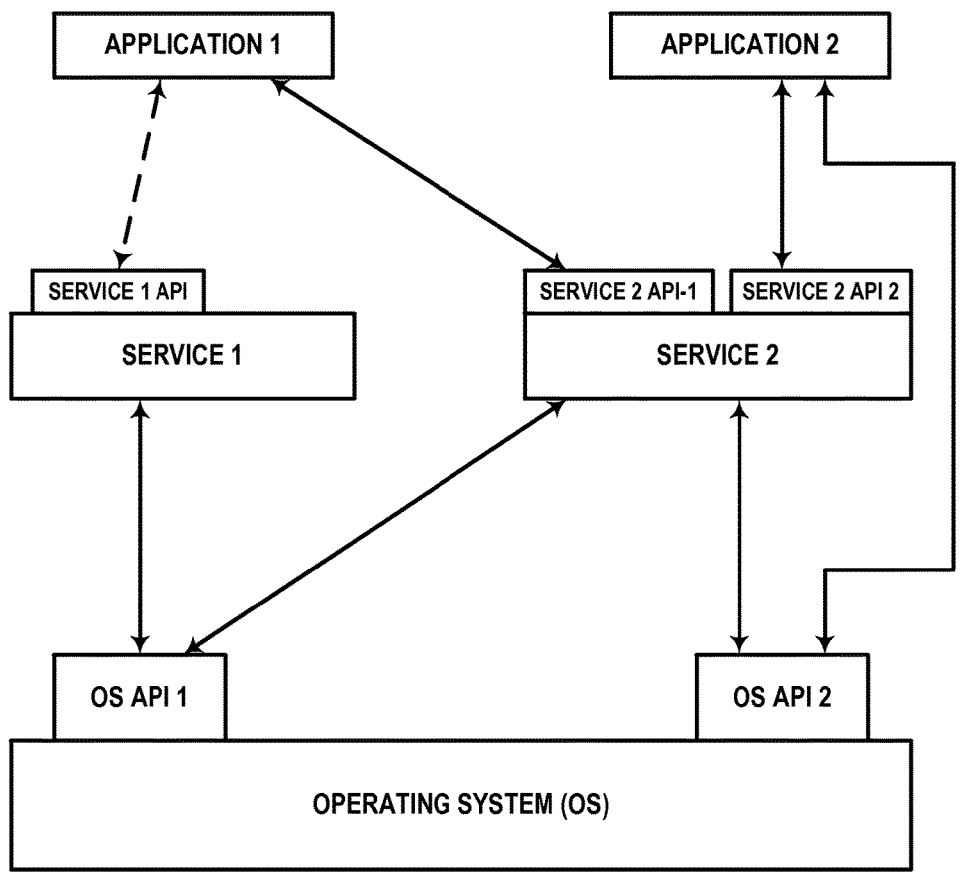
FIG. 10 illustrates an exemplary embodiment of a software stack usable in some embodiments of the invention.

In FIG. 10 ("Software Stack"), an exemplary embodiment, applications can make calls to Services A or B using several Service APIs and to Operating System (OS) using several as APIs, A and B can make calls to as using several as APIs.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 11:
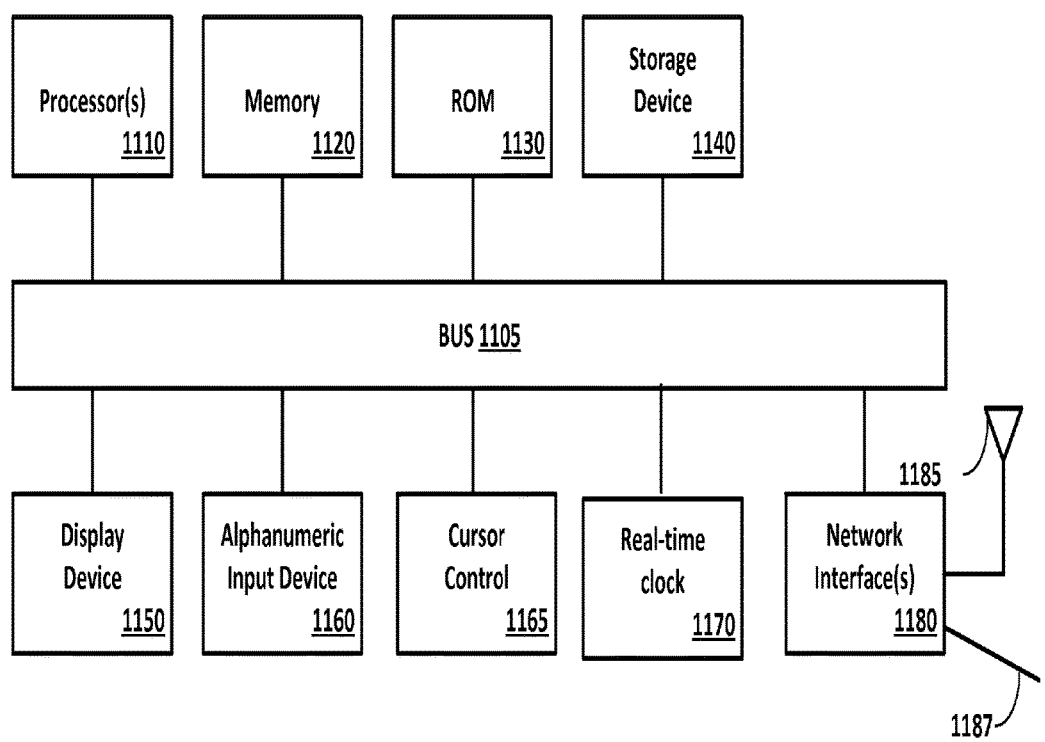
FIG. 11 illustrates, in block diagram form, an exemplary computing system for implementing concepts described herein.

FIG. 11 is a block diagram of one embodiment of a computing system 1100. The computing system illustrated in FIG. 11 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 11 may be used to provide a computing device and/or a server device.

Computing system 1100 includes bus 1105 or other communication device to communicate information, and processor 1110 coupled to bus 1105 that may process information.

While computing system 1100 is illustrated with a single processor, computing system 1100 may include multiple processors and/or co-processors 1110. Computing system 1100 further may include random access memory (RAM) or other dynamic storage device 1120 (referred to as main memory), coupled to bus 1105 and may store information and instructions that may be executed by processor(s) 1110. Main memory 1120 may also be used to store temporary variables or other intermediate information during execution of instructions by processor 1110.

Computing system 1100 may also include read only memory (ROM) 1130 and/or other static storage device 1140 coupled to bus 1105 that may store static information and instructions for processor(s) 1110. Data storage device 1140 may be coupled to bus 1105 to store information and instructions. Data storage device 1140 such as flash memory or a magnetic disk or optical disc and corresponding disk may be coupled to computing system 1100.

Computing system 1100 may also be coupled via bus 1105 to display device 1150, such as a cathode ray tube (CRT), liquid crystal display (LCD), or light emitting diode (LED) display to display information to a user. Computing system 1100 can also include an alphanumeric input device 1160, including alphanumeric and other keys, which may be coupled to bus 1105 to communicate information and command selections to processor(s) 1110. Another type of user input device is cursor control 1165, such as a touchpad, a mouse, a trackball, or cursor direction keys to communicate direction information and command selections to processor(s) 1110 and to control cursor movement on display 1150. Computing system 1100 may further include a real-time clock 1170. The real-time clock 1170 may be used for generating date/time stamps for data records, computing elapsed time, and other time-keeping functions. A real-time clock 1170 can be a battery-backed chipset with a settable date and time. Alternatively, a real-time clock 1170 may include logic to retrieve a real-time from a network source such as a server or an Internet server via network interfaces 1180, described below.

Computing system 1100 further may include one or more network interface(s) 1180 to provide access to a network, such as a local area network. Network interface(s) 1180 may include, for example, a wireless network interface having antenna 1185, which may represent one or more antenna(e). Computing system 1100 can include multiple wireless network interfaces such as a combination of WiFi, Bluetooth® and cellular telephony interfaces. Network interface(s) 1180 may also include, for example, a wired network interface to communicate with remote devices via network cable 1187, which may be, for example, an Ethernet cable, a coaxial cable, a fiber optic cable, a serial cable, or a parallel cable.

In one embodiment, network interface(s) 1180 may provide access to a local area network, for example, by conforming to IEEE 802.11b, 802.11g, or 802.11n standards, and/or the wireless network interface may provide access to a personal area network, for example, by conforming to Bluetooth® standards. Other wireless network interfaces and/or protocols can also be supported. In addition to, or instead of, communication via wireless LAN standards, network interface(s) 1180 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method comprising:
   selecting hard disk status information from a database of hard disk status records for a plurality of hard disks, the hard disk status information comprising a non-zero medium error count and an indicator of whether the disk has failed;
   for each hard disk in the plurality of hard disks generating a hard disk failure record comprising:
      an initial non-zero medium error count (NMEC),
      a date of the initial NMEC,
      a date that the hard disk failed, in response to determining that the hard disk has failed,
      a statistical classification value that is determined from the initial NMEC;
   for each statistical classification value, generating a hard disk failure probability record for the classification comprising:
      a percentage of hard disks that failed, and
      an average number of days to failure of the hard disks that failed, and;
   predicting subsequent hard disk failure of one or more hard disks based on the hard disk failure records.

2. The method of claim 1, wherein the hard disk failure record further comprises:
   a manufacturer and model of the hard disk.

3. The method of claim 1, wherein the hard disk failure record further comprises:
   a manufacturer and model of a storage system that houses the hard disk.

4. The method of claim 1, wherein the hard disk failure probability record for the classification further comprises an indication of the percentage of hard disks that failed within at least one of: 1 day, 7 days, 30 days, 60 days, or more than 60 days, of the date of the initial NMEC for the hard disk.

5. The method of claim 4, further comprising:
   receiving first hard disk status information for a first hard disk in a storage system, the first hard disk information indicating that the first hard disk has a first initial NMEC and a status of not FAILED;
   determining a probability that the first hard disk will fail within a predetermined period of time;
   receiving second hard disk status information for a second hard disk in a storage system, the second hard disk information indicating that the second hard disk has a second initial NMEC and a status of not FAILED;
   determining a probability that the second hard disk will fail within the predetermined period of time;
   determining a probability that the storage system will have at least one hard disk fail within the predetermined period of time.

6. The method of claim 1, wherein:
   a first statistical classification groups hard disk failure records having an initial NMEC of a less than or equal to a first predetermined threshold;
   a second statistical classification groups hard disk failure records having an initial NMEC value greater than the first predetermined threshold and less than or equal to
a second predetermined threshold; and
a third statistical classification groups hard disk failure
records having an initial NMEC greater than the second
predetermined threshold.

7. A non-transitory computer-readable storage medium that stores processor-executable instructions that, when executed by a processor, perform operations comprising:
selecting hard disk status information from a database of hard disk status records for a plurality of hard disks, the hard disk status information comprising a non-zero medium error count and an indicator of whether the disk has failed;
for each hard disk in the plurality of hard disks generating a hard disk failure record comprising:
an initial non-zero medium error count (NMEC),
a date of the initial NMEC,
a date that the hard disk failed, in response to determining that the hard disk has failed,
a statistical classification value that is determined from the initial NMEC;
for each statistical classification value, generating a hard disk failure probability record for the classification comprising:
a percentage of hard disks that failed, and
an average number of days to failure of the hard disks that failed, and;
predicting subsequent hard disk failure of one or more hard disks based on the hard disk failure records.

8. The medium of claim 7, wherein the hard disk failure record further comprises:
a manufacturer and model of the hard disk.

9. The medium of claim 7, wherein the hard disk failure record further comprises:
a manufacturer and model of a storage system that houses the hard disk.

10. The medium of claim 7, wherein the hard disk failure probability record for the classification further comprises an indication of the percentage of hard disks that failed within at least one of: 1 day, 7 days, 30 days, 60 days, or more than 60 days, of the date of the initial NMEC for the hard disk.

11. The medium of claim 10, the operations further comprising:
receiving first hard disk status information for a first hard disk in a storage system, the first hard disk information indicating that the first hard disk has a first initial NMEC and a status of not FAILED;
determining a probability that the first hard disk will fail within a predetermined period of time;
receiving second hard disk status information for a second hard disk in a storage system, the second hard disk information indicating that the second hard disk has a second initial NMEC and a status of not FAILED;
determining a probability that the second hard disk will fail within the predetermined period of time;
determining a probability that the storage system will have at least one hard disk fail within the predetermined period of time.

12. The medium of claim 7, wherein:
a first statistical classification groups hard disk failure records having an initial NMEC of a less than or equal to a first predetermined threshold;
a second statistical classification groups hard disk failure records having an initial NMEC value greater than the first predetermined threshold and less than or equal to a second predetermined threshold; and
a third statistical classification groups hard disk failure records having an initial NMEC greater than the second predetermined threshold.

13. A system comprising:
a processor coupled to a memory programmed with processor-executable instructions, that when executed perform operations comprising:
selecting hard disk status information from a database of hard disk status records for a plurality of hard disks, the hard disk status information comprising a non-zero medium error count and an indicator of whether the disk has failed;
for each hard disk in the plurality of hard disks generating a hard disk failure record comprising:
an initial non-zero medium error count (NMEC),
a date of the initial NMEC,
a date that the hard disk failed, in response to determining that the hard disk has failed,
a statistical classification value that is determined from the initial NMEC;
for each statistical classification value, generating a hard disk failure probability record for the classification comprising:
a percentage of hard disks that failed, and
an average number of days to failure of the hard disks that failed, and;
predicting subsequent hard disk failure of one or more hard disks based on the hard disk failure records.

14. The system of claim 13, wherein the hard disk failure record further comprises:
a manufacturer and model of the hard disk.

15. The system of claim 13, wherein the hard disk failure record further comprises:
a manufacturer and model of a storage system that houses the hard disk.

16. The system of claim 13, wherein the hard disk failure probability record for the classification further comprises an indication of the percentage of hard disks that failed within at least one of: 1 day, 7 days, 30 days, 60 days, or more than 60 days, of the date of the initial NMEC for the hard disk.

17. The system of claim 16, the operations further comprising:
receiving first hard disk status information for a first hard disk in a storage system, the first hard disk information indicating that the first hard disk has a first initial NMEC and a status of not FAILED;
determining a probability that the first hard disk will fail within a predetermined period of time;
receiving second hard disk status information for a second hard disk in a storage system, the second hard disk information indicating that the second hard disk has a second initial NMEC and a status of not FAILED;
determining a probability that the second hard disk will fail within the predetermined period of time;
determining a probability that the storage system will have at least one hard disk fail within the predetermined period of time.

18. The system of claim 13, wherein:
a first statistical classification groups hard disk failure records having an initial NMEC of a less than or equal to a first predetermined threshold;
a second statistical classification groups hard disk failure records having an initial NMEC value greater than the first predetermined threshold and less than or equal to a second predetermined threshold; and a third statistical classification groups hard disk failure records having an initial NMEC greater than the second predetermined threshold.

\* \* \* \* \*